United States Patent [19]

Narayanan et al.

[11] 3,853,856

[45] Dec. 10, 1974

[54] HETEROCYCLIC AZOMETHINES OF N-THIAZOLINYL AND N-THIAZINYL INDOLES

[75] Inventors: Venkatachala L. Narayanan, Hightstown; Rudiger D. Haugwitz, Titusville, both of N.J.

[73] Assignee: E. R. Squibb & Sons, Inc., Princeton, N.J.

[22] Filed: Apr. 30, 1973

[21] Appl. No.: 355,853

[52] U.S. Cl........ 260/240.1, 260/243 R, 200/306.7, 424/246, 424/251, 424/263, 424/270
[51] Int. Cl............................................. C09b 23/00
[58] Field of Search..................... 260/240 G, 240.1

[56] References Cited
UNITED STATES PATENTS 3,755,316   8/1973   Narayanan et al.............. 260/243 R

*Primary Examiner*—John D. Randolph
*Attorney, Agent, or Firm*—Lawrence S. Levinson; Merle J. Smith; Donald J. Barrack

[57] ABSTRACT

Novel indoles having a thiazolinyl or thiazinyl group in the 1-position and an azomethine group in either the 5-or the 6-position are useful as anti-inflammatory agents.

6 Claims, No Drawings

HETEROCYCLIC AZOMETHINES OF N-THIAZOLINYL AND N-THIAZINYL INDOLES

SUMMARY OF THE INVENTION

Indoles having a thiazolinyl or thiazinyl group in the 1-position and an azomethine group in either the 5- or the 6-position are anti-inflammatory agents. Azomethines of N-thiazolinyl and N-thiazinyl indoles having the structure:

(I)
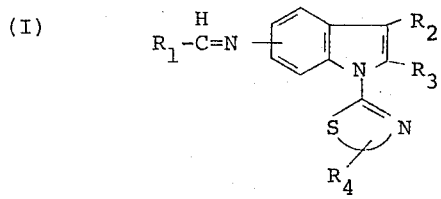

are preferred; the azomethine group is attached to the indole in either the 5- or the 6-position. In formula I and throughout the specification the symbols are as defined below.

$R_1$ is a heterocyclic group of 5 or 6 atoms containing one or two hetero atoms selected from nitrogen, oxygen, and sulfur.

$R_2$ is hydrogen, lower alkyl, phenyl, $-(CH_2)_{n^1}COOR_5$, cyano, halo, or di(lower alkyl)amino lower alkyl; $R_5$ is hydrogen, lower alkyl or phenyl; and $n^1$ is 0 to 5.

$R_3$ is hydrogen, lower alkyl, phenyl or $-(CH_2)_{n^1}COOR_5$.

The group

represents 5- or 6-membered ring containing 3 or 4 carbon atoms, respectively, wherein the 2 or 3 carbon atoms not shown may include a substituent as shown. $R_4$ is hydrogen, lower alkyl or phenyl.

The term "lower alkyl" as employed herein includes both straight and branched chain radicals of up to 8 carbon atoms, e.g., methyl, ethyl, propyl, isopropyl, t-butyl, n-pentyl, 4,4-dimethyl pentyl, octyl and the like.

The term "halo" includes fluorine, bromine, chlorine and iodine.

DETAILED DESCRIPTION OF THE INVENTION

Indoles containing a 2-thiazolin-2-yl or 2-thiazin-2-yl group in the 1-position and an azomethine group of the formula $R_1HC=N-$ in either the 5- or the 6-position are anti-inflammatory agents.

Compounds of formula I are preferred and compounds of formula I wherein $R_2$, $R_3$, and $R_4$ are hydrogen are especially preferred.

$R_1$ may be any heterocyclic group of 5 or 6 atoms containing one or two hetero atoms selected from nitrogen, oxygen, and sulfur. The heterocyclic group may be substituted with a lower alkyl group. Exemplary of the heterocyclic groups contemplated are furan, imidazole, isoxazole, oxazole, pyridine, pyrimidine, pyrrole, thiazole, and thiophene.

The azomethines of N-thiazolinyl and N-thiazinyl indoles of this invention are synthesized from indoles having the structure:

(II)
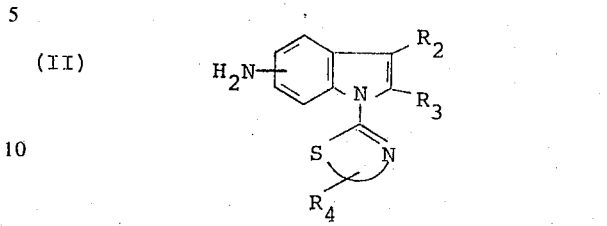

wherein the amino group is in either the 5- or the 6-position. The indole of formula II is reacted with an aldehyde having the formula:

(III)
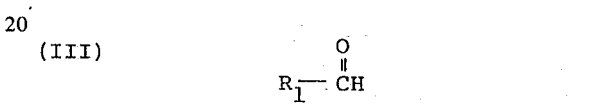

The molar ratio of indole of formula II to the aldehyde of formula III is from 1:1 to 1:50. The reaction is carried out at a temperature of from 80°C to 200°C for a period of about 5 minutes to about 24 hours. A protic solvent (e.g., ethanol, 3-methylbutanol, etc.) or an aprotic solvent (e.g., nitrobenzene, dimethylsulfoxide, dimethylformamide, etc.) may be used to run the condensation reaction, or if desired, an excess of the aldehyde reactant may be used in lieu of solvent. If desired, an acid catalyst (e.g., a conventional acid such as hydrochloric, sulfuric or benzenesulfonic acids or a Lewis acid such as $ZnCl_2$ or $POCl_3$) may be used.

Alternatively, the compounds of this invention may be formed by refluxing an amine of formula II with an aldehyde of formula III. The use of an azeotroping agent (e.g., benzene) permits separation of the water formed during the reaction.

Exemplary of the heterocyclic aldehydes which may be used to prepare the compounds of formula I are:
furfural,
2-imidazolecarboxaldehyde,
3-isoxazolecarboxaldehyde,
5-methylfurfural,
6-methyl-2-pyridinecarboxaldehyde,
N-methylpyrrole-2-carboxaldehyde,
3-methyl-2-thiophenecarboxaldehyde,
5-methyl-2thiophenecarboxyaldehyde,
4-oxazolecarboxaldehyde,
2-pyridinecarboxaldehyde,
3-pyridinecarboxaldehyde,
4-pyridinecarboxaldehyde,
pyrrole-2-carboxaldehyde,
2-pyrimidinecarboxaldehyde,
4-thiazolecarboxaldehyde,
2-thiophenecarboxaldehyde.

Preparation of the aminoindoles of formula II is disclosed in co-pending patent application, Ser. No. 191,092, filed Oct. 20, 1971, now U.S. Pat. 3,755,316 issued Aug. 29, 1973, the disclosure of which is incorporated herein by reference.

Specifically, the 5- or the 6-aminoindoles of formula II are prepared from the corresponding 5- or 6-nitroindoles i.e., indoles having the formula:

(IV)

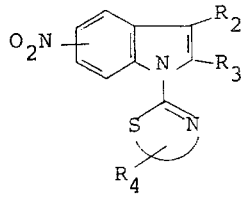

wherein the nitro group is in either the 5- or the 6- position. Reduction of the nitroindole to an aminoindole may be carried out by first dissolving the nitroindole in an organic solvent such as ethanol, tetrahydrofuran, dioxane, etc. and then reducing catalytically using hydrogen under pressure in the presence of a catalyst such as Raney nickel. The reduction may be carried out at a pressure from 30 to 80 psi for a period of 2 hours to 1 day.

The compounds of this invention are used to treat inflammation in a mammalian species, e.g., rats, dogs, cats, monkeys, etc. Joint tenderness and stiffness (in conditions such as rheumatoid arthritis) are relieved by the above described indoles.

The indoles of this invention may be formulated for use as anti-inflammatory agents according to accepted pharmaceutical practice in oral dosage forms such as tablets, capsules, elixiers, or powders or in an injectable form. The compounds of this invention may be administered in amounts of about 100 mg/70 kg/day to 2g/70 kg/day, preferably 100 mg/70 kg/day to 1 g/70 kg/day.

The following examples further illustrate the invention.

EXAMPLE 1

1-(2-Thiazolin-2-yl)-5-(2-thienylideneamino)indole a. 5-Amino-N-(2-thiazolin-2-yl)indole 4.0 g. of 5-Nitro-N-(2-thiazolin-2-yl)indole (0.016 mole) is dissolved in 100 ml. of tetrahydrofuran and approximately one teaspoon of Raney nickel catalyst is added. The mixture is then hydrogenated at 65 psi over a period of 16 hours. The Raney nickel is removed and a thin-layer chromatograph run on the THF solution indicates complete reduction (5% MeOH/CHCl$_3$-silica gel). 5-Amino-N-(2-thiazolin-2-yl)- indole is recovered from the solution.

b. 1-(2-Thiazolin-2-yl)-5-(2-thienylideneamino)indole

5-Amino-N-(2-thiazolin-2-yl) indole (2.1 g., 0.01 mole) and 2-thiophenecarboxaldehyde (2.0 g., 0.015 mole) are dissolved in 20 ml. of absolute ethanol and warmed (60°C) on the steam bath for 0.5 hour. The reaction mixture is concentrated to approximately one-third of its original volume and then stored overnight. The precipitated lemon yellow crystals of the Schiff's base are collected yielding 2.8 g. Recrystallization from ethanol yielded 2.3 g. of 1-(2-thiazolin-2-yl)-5-(2-thienylideneamino)indole, melting point 89°C to 91°C.

Analysis for $C_{16}H_{13}N_3S_2$:

| | |
|---|---|
| Calc'd: | C, 61.71; H, 6.21; N, 13.49. |
| Found | C, 61.38; H, 4.17; N, 13.41. |

EXAMPLES 2—14

Following the procedure of Example 1a but substituting the nitroindole of Column 1 for 5-nitro-N-(2-thiazolin-2-yl)-indole, the corresponding aminoindole is obtained. The aminoindole is reacted with the aldehyde of Column 2, following the procedure of Example 1b to yield the product of Column 3.

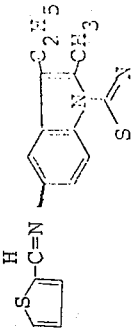

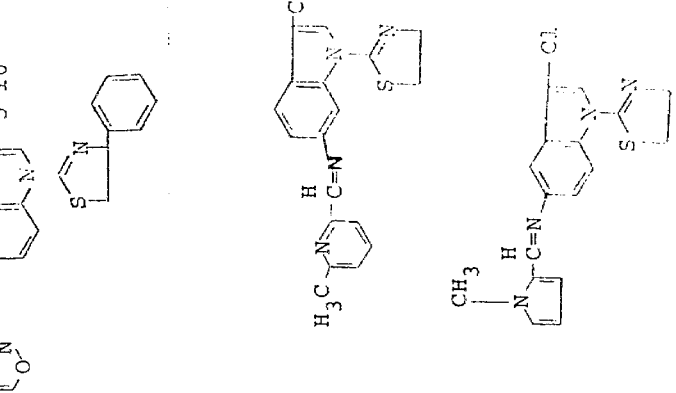

| Example | Column 1 | | Position of -NO₂ group | Column 2 | | Column 3 |
|---|---|---|---|---|---|---|
| | $R_2$ | $R_3$ | | R | $R_1$ | |
| 10 | H | C₄H₉ | 6 | (4-phenyl-5,6-dihydro-2H-1,3-thiazine) | 3-methylthiophene | (structure with C₄H₉, phenyl-thiazine, and methylthiophene-CH=N) |
| 11 | H | C₃H₆COOH | 5 | (tetrahydro-thiazine) | 5-methylthiophene | (structure with C₃H₆COOH, thiazine, and methylthiophene-CH=N) |
| 12 | COOH | COOH | 6 | (thiazoline) | pyrimidine | (structure with two COOH, thiazoline, and pyrimidine-CH=N) |
| 13 | H | H | 5 | (tetrahydro-thiazine) | pyridine | (structure with thiazine and pyridine-CH=N) |

| Example | R₂ | R₃ | Position of -NO₂ group | R₁ | Column 2 | Column 3 |
|---------|-----|-----|---|-----|-----|-----|
| 14 | C≡N | H | 6 | 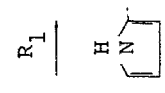 | 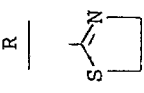 | 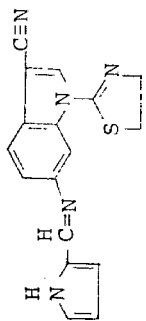 |
| 15 | H | H | 5 |  | | 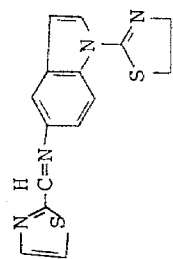 |

What is claimed is:

1. An indole having the formula

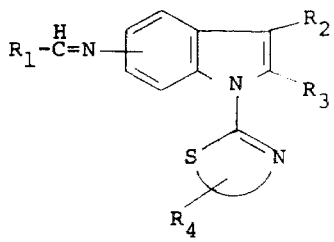

wherein the azomethine group is attached to the indole in the 5- or the 6-position; $R_1$ is a monocyclic heterocycle selected from the group consisting of furan, imidazole, isoxazole, oxazole, pyridine, pyrimidine, pyrrole, thiazole, and thiophene or one of said monocyclic heterocycles substituted with a lower alkyl group; $R_2$ is selected from the group consisting of hydrogen, lower alkyl, phenyl $-(CH_2)_{n_1}COOR_5$, cyano, halo, and di(lower alkyl)amino lower alkyl; $R_3$ is selected from the group consisting of hydrogen, lower alkyl, phenyl and $-(CH_2)_{n_1}COOR_5$; $R_4$ and $R_5$ are each selected from the group consisting of hydrogen, lower alkyl, and phenyl; $n_1$ is 0, 1, 2, 3, 4 or 5;

is a 5- or 6-membered ring containing 3 or 4 carbon atoms respectively.

2. An indole in accordance with claim 1 wherein $R_1$ is selected from the group consisting of furan, imidazole, isoxazole, oxazole, pyridine, pyrimidine, pyrrole, thiazole, and thiophene.

3. An indole in accordance with claim 2 wherein $R_2$, $R_3$, and $R_4$ are each hydrogen.

4. An indole in accordance with claim 2 having the formula

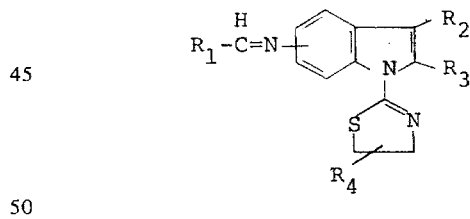

5. An indole in accordance with claim 2 having the formula

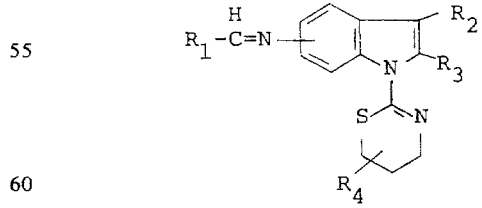

6. An indole in accordance with claim 4 having the name 1-(2-thiazolin-2-yl)-5-(2-thienylideneamino)indole.